Aug. 22, 1933.                E. L. BARRETT                 1,924,082
MOTOR ACTUATED CIRCUIT CONTROLLING MEANS
Filed Jan. 3, 1933
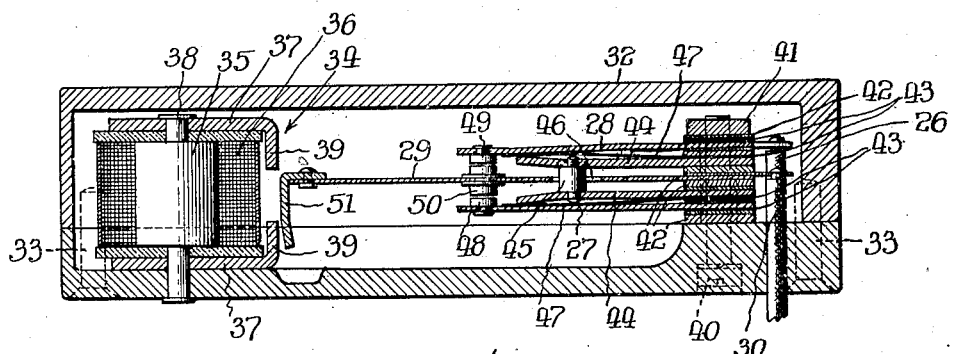
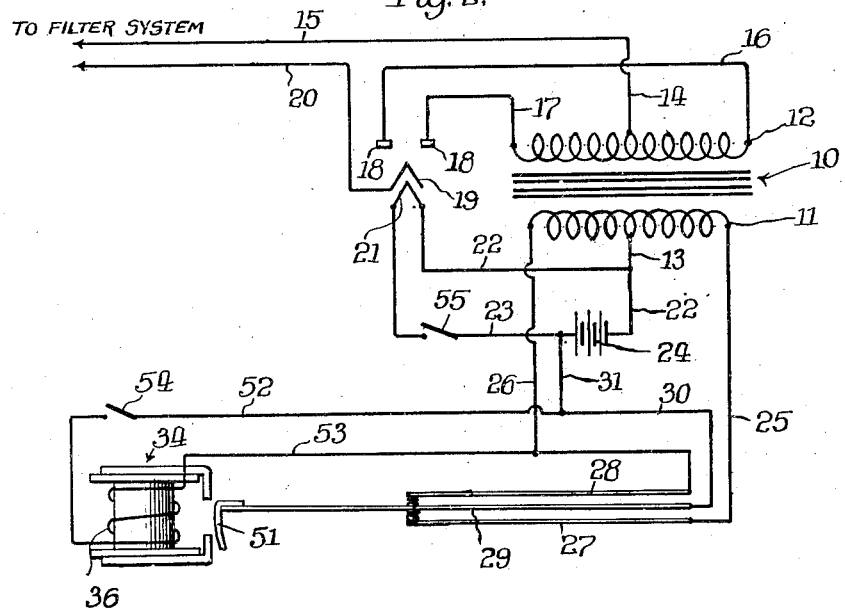
Inventor:
Edward L. Barrett,
By Chindall Parker Carlson
Attys

Patented Aug. 22, 1933

1,924,082

UNITED STATES PATENT OFFICE 1,924,082

MOTOR ACTUATED CIRCUIT CONTROLLING MEANS

Edward L. Barrett, Chicago, Ill., assignor to Utah Radio Products Co., Chicago, Ill., a Corporation of Illinois Application January 3, 1933. Serial No. 649,787

11 Claims. (Cl. 172—126)

The invention relates generally to a motor actuated circuit controlling means and has particular reference to means of this nature which is especially suited and adapted for use in connection with direct current transformer systems intended to replace the "B" battery which customarily supplies direct current to one circuit of a radio receiving set.

An object of the invention is to provide novel means of this character which is simple in construction and highly efficient in operation.

Another object of the invention is to provide in a novel direct current transforming system an improved mechanism for alternately establishing and breaking a plurality of circuits.

Another object resides in the provision, in such a system embodying an induction coil having a divided primary winding, of an improved means for establishing a circuit, first, through one part of the winding and, then, through the remaining portion of the winding.

Another object of the invention is to provide a new and improved device for alternately making and breaking a pair of circuits, said device being electromagnetically actuated and including an armature arranged for movement within the most effective range of magnetic force exerted by the electromagnet, yet without contact thereof with the electromagnetic poles.

More specifically stated, another object is to provide an improved circuit making and breaking device in a "B" battery eliminator which embodies a swinging armature in control of a normally open circuit and supported within the range of magnetic force of an electromagnet and eccentrically of the center of said force for movement along but never in contact with an active pole face of the electromagnet, and an energizing winding for the electromagnet which includes a shunt circuit closed to decrease the energization of said electromagnet below an effective point when the circuit is closed.

Other objects and advantages will become apparent in the following description and from the accompanying drawing, in which:

Fig. 1 is a central longitudinal section through a circuit making and breaking device embodying the features of the invention.

Fig. 2 is a wiring diagram of a direct current transforming system in which the circuit making and breaking device is incorporated.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In general the herein illustrated direct current transforming system embodies an induction coil having divided or center tapped primary and secondary windings. Alternating current of high potential induced in the secondary winding sections by direct current energization of the primary winding sections is rectified by a thermionic valve from which direct current of high potential is conducted through a suitable filter system to a radio receiving set. The sections of the primary winding are alternately and briefly connected with a source of direct current in such manner that the current flows through said sections whereby to induce said high potential current in the secondary winding. For intermittently establishing the respective circuits, which include said primary winding sections, a novel device is provided which possesses numerous advantages to be more clearly set forth as the description proceeds.

Referring particularly to Fig. 2, a simplified wiring diagram of a preferred system is illustrated, it being understood that the system as shown has been simplified by the omission of condensers, choke coils and like devices which may be introduced in the system whenever they are deemed necessary. 10 designates generally an induction coil having a primary winding 11 and a secondary winding 12. Both the primary and secondary windings are divided into two sections by center taps 13 and 14 respectively. The center tap 14 of the secondary winding may be connected through a lead 15 with any suitable load such for example as a filter system of the type shown in my copending application Serial No. 615,553, filed June 6, 1932.

The ends of the secondary winding are connected by wires 16 and 17 with plate elements 18 of a mercury-vapor thermionic valve. Said valve includes an ion-emitting or cathode element 19, which is connected by a lead 20 with the filter system, and a heating filament 21. The cathode is preferably indirectly heated; that is to say, leads 22, 23 connect the filament with a source of current 24, such as a storage battery, independently of the high potential circuit of the system.

The central tap 13 of the primary winding is connected with one side of the storage battery 24. The opposite ends of the primary winding are connected by wires 25, 26 with spaced contacts 27, 28 respectively. A central or common contact 29 is connected by leads 30, 31 with the other side of the battery 24 and is arranged for swinging movement to close a circuit either through the contact 27 or contact 28.

The contacts 27, 28 and 29 are part of a circuit making and breaking device, one preferred form of which is shown in Fig. 1. The device includes a sectional casing 32 assembled together as by screws 33. The casing is elongated and at one end an electromagnetic device 34 is mounted. The device comprises a core 35, winding 36 and pole pieces 37 which overlie and are secured as at 38 to the end faces of the core. The pole pieces extend longitudinally of the casing beyond the edge of the winding and are turned inwardly toward each other, as at 39, to dispose the active ends of the pole pieces in the same plane and in a spaced relationship which is less than the corresponding dimension of the winding and core. Other arrangements of the electromagnet may be used but it is preferred that one or both active pole faces be directed toward the other end of the casing.

The other end of the casing mounts the contacts 27, 28 and 29 and the attendant structure. Each of said contacts is preferably in the form of an elongated flat resilient member which is rigidly secured to the base by a bolt 40 and nut 41 extending through suitably insulated apertures in the ends of said contacts. Spacers 42 and insulating material 43 are suitably interposed between said members. Between the two outer contacts 27 and 28 are a pair of rigid, elongated fingers 44 which extend adjacent and nearly to the ends of the contacts 27, 28. Preferably, the fingers are rigidly secured together by such means as a pin 45 which in this instance extends through an aperture 46 in the center contact 29. The fingers 44 are electrically insulated from the contacts 27, 28 by strips of insulation 47 and from the contact 29 by enlarging the aperture 46. The enlarged aperture also allows the contact 29 to move freely. The fingers 44 serve as spacers and limiting abutments for the contacts 27, 28. Said contacts are fashioned to be normally under a tension which urges said contacts toward each other and into engagement with the fingers 44. Preferably, the contacts are engaged only near the outer ends thereof and this relationship is herein accomplished by locating the fingers 44 so that the end portions thereof may be bent or turned angularly outwardly away from each other, as shown, into a proper engagement with the contacts 27, 28. This arrangement serves also as a means for obtaining adjustment of either contact 27 or 28 relative to the contact 29 since, after the parts have been assembled, the ends of the fingers may in the bending operation produce the desired adjustment. Long use or wear will not affect the original adjustment since the contacts are constantly urged toward the proper position and though repeatedly bent always return to their normal position. The outer or free ends of the contacts 27 and 28 carry opposed inwardly facing contact points 48, 49 respectively.

The central contact 29 preferably occupies a straight-line, untensioned position substantially intermediate the contacts 27, 28 and carries in opposition to the contact points 48, 49 a double contact point 50. The contact 29 is considerably longer than the contacts 27, 28 and extends to a point substantially adjacent to the transverse plane in which the active faces of the magnetic poles are situated. This end of the contact carries an armature 51 which is substantially L-shaped to locate one leg of the armature in a plane substantially paralleling the plane of said active pole faces. It will be noted that the armature 51 may swing relative to the electromagnet but that said armature can never come in contact therewith. It has been found that the clearance between the armature and the poles is important, the best results being obtained when said clearance is less than .025 of an inch and preferably between .005 and .010 of an inch. In illustrating this clearance in the drawing, it has been necessary to depart from scale and exaggerate the distance between the parts.

The contact 29 in its normal position supports the armature 51 in an off-center position with respect to the active faces of the poles in such manner that, when the electromagnet is energized, the armature will be attracted and swung by the exerted magnetic force. Such movement establishes a circuit, in this instance, through contacts 28, 29 and places the contact 29 under tension since it is of resilient material. Upon deenergization of the electromagnet, the armature will move toward and past its original position to establish the opposite circuit through contacts 27, 29. Interrupted energization of the electromagnet, therefore, will cause the contact 29 to oscillate or vibrate between contacts 27 and 28.

It is preferred to control the intermittent energization of the electromagnet by the making and breaking of the circuits through the contacts 27, 28 and 29. In the present instance, this end is accomplished in the following manner: One end of the electromagnet winding 36 is connected by a lead 52 with one side of the battery 24 through the lead 31. The other side of the winding 36 is connected through a lead 53 with the wire 26 by which one end of the primary winding 11 is connected with the contact 28. The circuit through the electromagnet winding will, therefore, be closed when the circuit through the contacts 28, 29 (which for convenience may be termed the initial or starting contacts) is open, but will be shunted out when said contacts engage to close the circuit controlled thereby.

A description of the operation of the system will start with the system in the inoperative or idle position illustrated in the drawing: 54 and 55 indicate switches controlling the circuit for the electromagnet 34 and the heating filament 21 respectively, although in actual operation these two switches may be combined in any well-known manner. Presuming that both of these switches are closed, the filament 21 is heated and the electromagnet 34 is energized through a circuit from the battery comprising lead 22, center tap 13, one section of the primary winding 11, wire 26, lead 53, electromagnet winding 36, leads 52 and 31. Upon closing this circuit, only a small current is induced in the corresponding section of the secondary winding 12 because the voltage drop through the energized section of the primary winding 11 is quite small as compared with the voltage drop in the electromagnet winding 36.

The armature 51 under the force exerted by the energized electromagnet is drawn toward a central position with respect to the exerted magnetic force thereby placing the contact 29 under tension and eventually closing the circuit through contacts 28, 29. Thereupon the electromagnet circuit is shunted out to practically deenergize the electromagnet and a surge of current through one section of the primary winding 11 obtained. The circuit from the battery is then through lead 22, center tap 13, primary winding section, wire 26, contact 28, contact points 49, 50, contact 29 and leads 30, 31. Obviously, when the electromagnet is deenergized, the resilient force stored up in the contact 29 reverses the swinging movement of said contact. Moreover, the contact 28 being resilient and having served somewhat on the order of a bumper in stopping movement of the contact 29 exerts its force in reversing the movement of said contact 29.

Immediately the circuit through contacts 28, 29 is broken, the electromagnet is reenergized to again exert its force on the armature 51. But the armature 51 is of substantial mass so that the inertia thereof is ample to continue the swinging movement of the contact 29 until the contact points 48, 50 engage to establish the circuit through contacts 29, 27, wire 25, the other section of primary winding 11, center tap 13, lead 22, battery 24 and leads 31, 30. Subsequently the electromagnetic force acting on the armature, together with the resilient bumper action of contact 27, causes a return swinging movement of the contact 29 which continues until the circuit through contacts 28, 29 is again established and the electromagnet deenergized.

By the above described arrangement of parts, the circuits through the sections of the primary winding may be alternately energized with exceeding rapidity to produce a corresponding current flow in the secondary which, after it passes through the rectifier, is conveyed to the filter system as direct current of high potential. The transforming system accordingly is unusually efficient, the circuit making and breaking device is of such simple construction that it may be manufactured at a low cost, and operative adjustments thereof may be readily made. Once the device has been properly adjusted for operation, it will operate satisfactorily in any position in which it may be placed, since the effect of any outside force, such as gravity, on the swinging movements of the contact 29 is negligible. The structural form of the make and break device provides a small compact unit which is a desirable advantage when the system is employed in connection with the elimination of the "B" battery commonly used in automobile radio receiving sets.

Moreover, when the device is thus used, the variations which so frequently occur in the potential of automobile batteries cannot disadvantageously affect the operation of the device since a minimum potential will reciprocate the contact 29 operatively while a maximum potential does not cause the armature to strike the opposed pole faces. Furthermore, the offset relationship of the armature and the center of magnetic force, coupled with the normally idle, out of contact position of the contact 29 permits of a simple and effective arrangement of the starting and running circuits of the device.

I claim as my invention:

1. A circuit making and breaking device comprising, in combination, an elongated casing, an electromagnet mounted in one end of said casing and having pole faces located substantially in a plane transverse of said casing and facing toward the other end thereof, three spaced contacts mounted in the other end of said casing and extending toward said electromagnet, said contacts being formed of resilient material with the center one of said contacts extending to a point substantially adjacent to said pole faces, an armature carried by the end of the center contact for swinging movement past said pole faces, said armature being normally disposed eccentrically with respect to said pole faces so that energization of the electromagnet will produce movement of said armature and swing said center contact into circuit closing engagement with one of the outer contacts, the other of said outer contacts being engageable by said center contact upon a return movement thereof when the electromagnet is deenergized, said outer contacts being resiliently urged toward each other, and spacing fingers interposed between said outer contacts for abutment thereby to limit the inward movement thereof, the ends of said fingers being bent toward said outer contacts to provide a single point of engagement between a contact and its associated finger and to adjust the position of the outer contacts with respect to the center contact.

2. A circuit making and breaking device for a direct current transforming system comprising spaced contacts controlling separate circuits in said system, an intermediate and common contact for completing either circuit, means for reciprocating said common contact between said spaced contacts, all of said contacts being of resilient material with the common contact being normally untensioned and the spaced contacts under a tension which urges said spaced contacts toward said common contact, and a limit finger underlying each of said spaced contacts for engagement therewith, the said fingers being bent for engagement only with said spaced contacts near the free ends thereof.

3. A circuit making and breaking device for a direct current transforming system comprising spaced contacts controlling separate circuits in said system, an intermediate and common contact for completing either circuit, means for reciprocating said common contact between said spaced contacts, all of said contacts being of resilient material with the common contact being normally untensioned and the spaced contacts under a tension which urges said spaced contacts toward said common contact, a limit finger underlying each of said spaced contacts for engagement therewith, and means connecting said fingers and maintaining a spaced relationship therebetween.

4. A circuit making and breaking device having the combination of three spaced contact elements formed of resilient material and supported at one end, intermediate members disposed between said elements, the outer elements being normally under a tension urging said elements into engagement with said members, said members being bent to engage said outer elements near the free ends thereof to define their proper adjustment relative to the center element, and means for reciprocating said center element into circuit closing contact alternately with said outer elements.

5. In a circuit making and breaking device, the combination of three spaced contact elements formed of resilient material and supported at one end to extend in approximate parallelism in the same direction, intermediate members disposed between said elements, the outer elements being normally under a tension urging said elements into engagement with said members, said members being bent to engage said outer elements near the free ends thereof to define their proper adjustment relative to the center element, and an electromagnet energizable to move said center element into contact with one of said outer elements and deenergizable to release said element for return movement into engagement with the opposite element.

6. In a circuit making and breaking device, the combination of three spaced contact elements formed of resilient material and supported by one end, intermediate members disposed between said elements, the outer elements being normally under a tension urging said elements into engagement with said members, said members being bent to engage said outer elements near the free ends thereof to define their proper adjustment relative to the center element, and means for reciprocating said center element into circuit closing contact alternately with said outer elements, said outer elements being free for movement against the tension thereof when engaged by said center element.

7. In a circuit making and breaking device, the combination of contact elements for alternately closing a plurality of circuits including spaced contacts and a movable resilient element having a normal untensioned position out of contact with both of said spaced contacts, an electromagnet, and an armature on said movable element disposed within the effective range of said electromagnet, said armature in the normal position of said movable element being located eccentrically of said range for movement to establish one circuit immediately upon energization of said electromagnet, said armature having a mass ample to carry said movable element in an opposite direction for completing another circuit upon deenergization of said electromagnet.

8. In a circuit making and breaking device, the combination of contact elements for alternately closing a plurality of circuits including a movable resilient element having a normal untensioned position, an electromagnet, and an armature connected with said movable element and disposed within the effective range of said electromagnet, said armature in the normal position of said movable element being disposed for movement to establish one circuit immediately upon energization of said electromagnet, an electromagnet energizing circuit so connected with the circuit first established as to be shunted out upon such establishment, said armature having a mass ample to carry said movable element in an opposite direction for completing another circuit against the force of the reenergized electromagnet.

9. In a circuit controlling means the combination of a base, an electro-magnet mounted at one end of said base and having an active pole face located in a transverse plane relative to the base, a reed mounted on the other end of the base and having a free end terminating adjacent to said pole face, an armature mounted on said free end and supported by the reed for swinging movement in a plane substantially paralleling the plane of said face and closely adjacent thereto, a pair of fixed contacts located one on either side of said reed, contact means on said reed engageable with either of said fixed contacts in the movement of said reed, said reed having a normally idle position out of contact with both fixed contacts and at one side of the center of magnetic attraction of said active face, and means for intermittently energizing said electro-magnet.

10. A circuit controlling device comprising in combination an electromagnet having a winding and a pole piece presenting an active pole face, an armature supported for movement along but never in contact with said face, said armature having an idle position eccentric with respect to the center of magnetic force, a normally open contact device arranged to be closed in the attracted movement of said armature toward the center of magnetic force, and an energizing circuit for said winding including a shunt circuit closed to deenergize said electromagnet when said contact device is closed.

11. A circuit controller comprising an electromagnet including a pole piece with an exposed active face, an armature opposing said face, a resilient mounting device by which said armature is normally held in eccentric position relative to the center of the magnetic field of said pole piece and by which the armature is maintained for reciprocation along said face in close proximity thereto but out of contact therewith at all times, and means including two spaced and normally open contact devices controlling separate circuits, one of said contact devices serving in the movement of said armature to intermittently make and break a circuit through said electromagnet and thereby cause reciprocation of said armature.

EDWARD L. BARRETT.

DISCLAIMER 1,924,082.—*Edward L. Barrett*, Chicago, Ill. MOTOR ACTUATED CIRCUIT CONTROLLING MEANS. Patent dated August 22, 1933. Disclaimer filee August 4, 1938, by the assignee, *Utah Radio Products Company;* the patented, assenting.

Hereby enters this disclaimer to claims 2, 3, 4, 5, 6, 7, and 8 of said specification.

[*Official Gazette August 23, 1938.*]